United States Patent
Molaison

(10) Patent No.: US 8,202,349 B2
(45) Date of Patent: Jun. 19, 2012

(54) METHOD AND APPARATUS FOR REMOVAL OF CARBON DIOXIDE FROM PRE-COMBUSTION SYNGAS

(75) Inventor: Jennifer Lynn Molaison, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 375 days.

(21) Appl. No.: 12/494,870

(22) Filed: Jun. 30, 2009

(65) Prior Publication Data
US 2010/0325958 A1    Dec. 30, 2010

(51) Int. Cl.
B01D 53/22    (2006.01)
B01D 19/00    (2006.01)
B01D 53/14    (2006.01)

(52) U.S. Cl. ......... 95/51; 95/178; 95/192; 95/193; 95/236; 96/4; 96/8; 96/234; 96/242; 96/274; 48/128

(58) Field of Classification Search ........ 95/43, 44, 95/45, 51, 173, 174, 178, 179, 192, 193, 95/236; 96/4, 5, 8, 10, 234, 242, 274; 48/128
See application file for complete search history.

(56) References Cited

U.S. PATENT DOCUMENTS

| | | | |
|---|---|---|---|
| 5,876,486 A * | 3/1999 | Steinwandel et al. | 95/51 |
| 6,128,919 A | 10/2000 | Daus et al. | |
| 6,343,462 B1 | 2/2002 | Drnevich et al. | |
| 6,355,092 B1 * | 3/2002 | Jansen et al. | 95/51 |
| 6,588,212 B1 | 7/2003 | Wallace et al. | |
| 6,666,906 B2 * | 12/2003 | Hallman | 95/52 |
| 7,104,530 B2 * | 9/2006 | Boye | 96/10 |
| 7,318,854 B2 * | 1/2008 | Sirkar | 95/45 |
| 2005/0265911 A1 | 12/2005 | Yuan | |
| 2008/0276803 A1 * | 11/2008 | Molaison et al. | 95/236 |
| 2009/0199713 A1 * | 8/2009 | Asprion et al. | 95/236 |

FOREIGN PATENT DOCUMENTS

WO    WO 2007/134994 A2 * 11/2007

OTHER PUBLICATIONS

Great Britain Search Report for corresponding GB Application No. 1010353.9, dated Sep. 17, 2010.

* cited by examiner

Primary Examiner — Jason M Greene
(74) Attorney, Agent, or Firm — Armstrong Teasdale LLP

(57) ABSTRACT

A method for processing pre-combustion syngas includes, in an exemplary embodiment, providing an absorber unit having a membrane contactor having a plurality of micro-pores, channeling pre-combustion syngas along a first surface of the membrane contactor, channeling an amine based solvent along a second opposing surface of the membrane contactor, and contacting the solvent with the syngas such that the solvent and the syngas contact at gas-liquid interface areas, defined by the plurality of micro-pores in the membrane contactor, to separate $CO_2$ from the flue gas by a chemical absorption of $CO_2$ into the solvent to produce a solvent containing $CO_2$.

20 Claims, 5 Drawing Sheets

METHOD AND APPARATUS FOR REMOVAL OF CARBON DIOXIDE FROM PRE-COMBUSTION SYNGAS

BACKGROUND OF THE INVENTION

This field of the invention relates generally to industrial combustion systems, and more particularly to methods and systems for removing carbon dioxide ($CO_2$) from pre-combustion syngas before passing to a gas turbine power system.

At least some known carbon separation technologies intervene at different points in coal and/or natural gas systems. For example, carbon separation technologies that separate $CO_2$ from combustion flue gases are generally known as post-combustion carbon separation technologies. Known post-combustion carbon separation technologies include processes, for example, physical absorption, cryogenic separation, solid sorbent separation, chemical looping combustion, chemical absorption, and/or membrane separation. In addition, these carbon technologies can be used to remove $CO_2$ from pre-combustion gasses, such as syngas.

Some known chemical absorption processes attempt to remove $CO_2$ from the flue gases by an exothermic reaction of $CO_2$ with separation solvents, for example, potassium carbonate, sodium hydroxide, amine-based, and ammonia based solvents. During a known chemical absorption process, for example, a flue gas and an ammonia-based liquid counter-currently flow within a scrubber.

The combustion flue gas stream generally includes a smaller volume of $CO_2$ as compared to the larger volume of the flue gas. Known scrubbers generally require equipment sizes capable of processing the larger volumes of flue gas. During processing within known scrubbers, the flue gas is dispersed into the liquid causing gas bubbles to be formed within the liquid. The $CO_2$ absorption amount of the liquid partially depends on a total gas-liquid contact area, which is the sum of the surface areas of the gas bubbles. The liquid may absorb $CO_2$ and other impurities, for example, carbon oxysulfide and carbon bisulfide. Such known impurities may cause foaming of the liquid and/or liquid degradation due to irreversible reactions with the impurities. Also, a driving force that is required to separate the $CO_2$ from the flue gas is determined based on a concentration (density) of flue gas components. The scrubber footprint and stripper regeneration energy increases capital cost, operating costs, and energy consumption. A plant capacity is also reduced because of electrical power consumption in known chemical absorption processes. It would be desirable to provide a method to remove the $CO_2$ before combustion to reduce energy requirements associated with post-combustion removal of $CO_2$.

BRIEF DESCRIPTION OF THE INVENTION

In one aspect, a method for processing pre-combustion syngas is provided. The method includes providing an absorber unit having a membrane contactor having a plurality of micro-pores, channeling pre-combustion syngas along a first surface of the membrane contactor, channeling an amine based solvent along a second opposing surface of the membrane contactor, and contacting the solvent with the syngas such that the solvent and the syngas contact at gas-liquid interface areas, defined by the plurality of micro-pores in the membrane contactor, to separate $CO_2$ from the flue gas by a chemical absorption of $CO_2$ into the solvent to produce a solvent containing $CO_2$.

In another aspect, a pre-combustion syngas processing apparatus comprising an absorber unit is provided. The absorber unit includes a housing, a membrane contactor positioned in the housing, a solvent area within the housing, with the solvent area containing an amine based solvent, and a syngas area within the housing, with the syngas area containing pre-combustion syngas. The membrane contactor separates the solvent from the syngas. The membrane contactor includes a plurality of micro-pores defining gas-liquid interface areas to separate $CO_2$ from the syngas by a chemical absorption of the $CO_2$ into the amine based solvent.

DETAILED DESCRIPTION OF THE INVENTION

Figure 1:
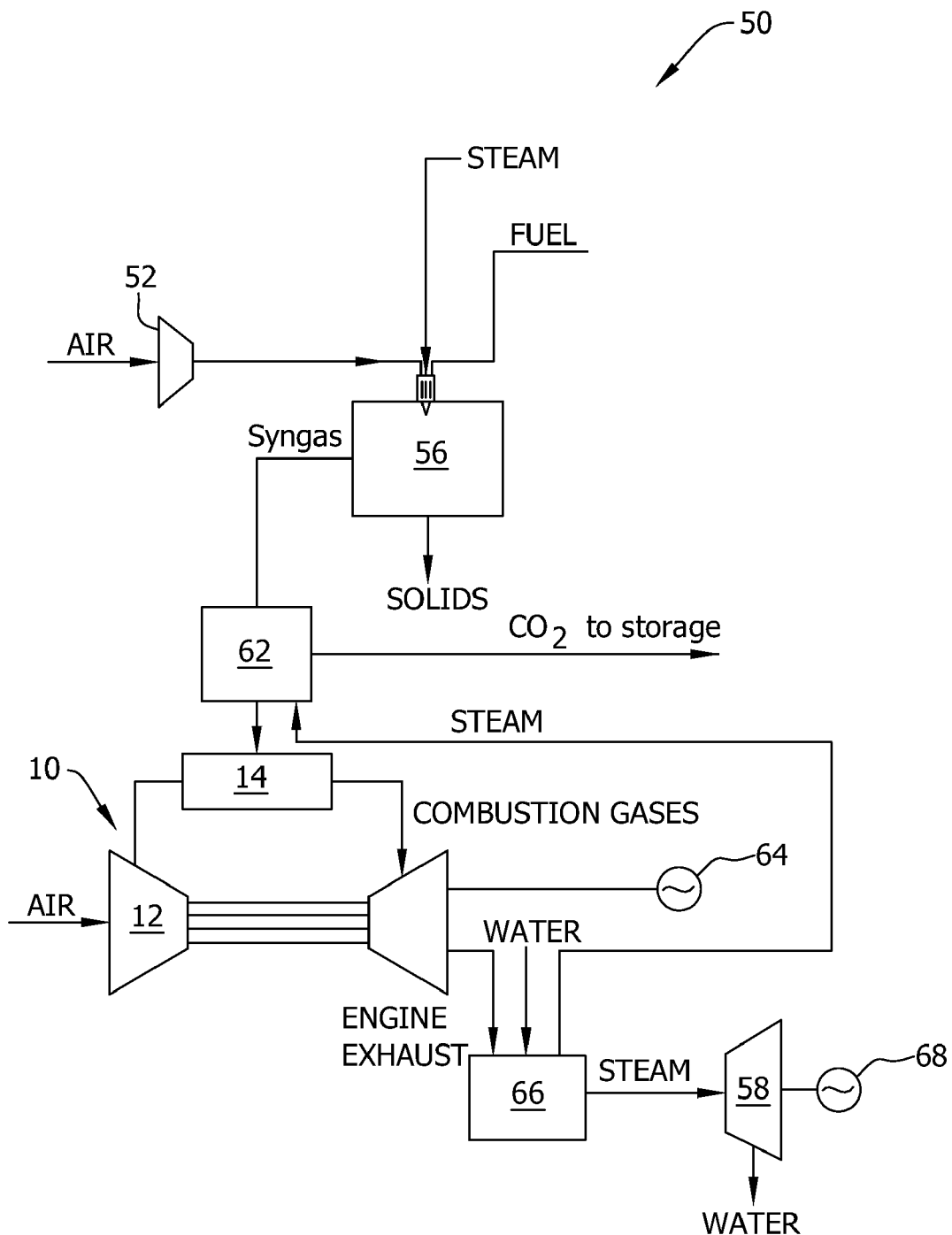
FIG. 1 is a schematic diagram of an exemplary known integrated gasification combined-cycle (IGCC) power generation system.

FIG. 1 is a schematic diagram of an exemplary known integrated gasification combined-cycle (IGCC) power generation system 50. IGCC system 50 generally includes a main air compressor 52, a gasifier 56 coupled in flow communication to main air compressor 52, a gas turbine engine 10, coupled in flow communication to gasifier 56, and a steam turbine 58. In operation, compressor 52 compresses ambient air. The compressed air is channeled to gasifier 56 for use in generating partially combusted gases, referred to herein as "syngas" for use by gas turbine engine 10 as fuel, as described below in more detail.

Gasifier 56 converts a mixture of fuel, the air supplied by air compressor 52, steam, and/or limestone into an output of syngas for use by gas turbine engine 10 as fuel. Although gasifier 56 may use any fuel, in some known IGCC systems 50, gasifier 56 uses coal, petroleum coke, residual oil, oil emulsions, tar sands, and/or other similar fuels. In some known IGCC systems 50, the syngas generated by gasifier 56 includes carbon dioxide. The syngas generated by gasifier 56 may be cleaned in a clean-up system 62 before being channeled to gas turbine engine combustor 14 for combustion thereof. Carbon dioxide may be separated from the syngas during clean-up and, in some known IGCC systems 50, compressed for storage. The power output from gas turbine engine 10 drives a generator 64 that supplies electrical power to a power grid. Exhaust gas from gas turbine engine 10 is supplied to a heat recovery steam generator 66 that generates steam for driving steam turbine 58. Power generated by steam turbine 58 drives an electrical generator 68 that provides electrical power to the power grid. In the exemplary embodiment, steam from heat recovery steam generator 66 is supplied to clean-up system 62 for the removal of $CO_2$ in the syngas. In another embodiment, the syngas may be formed with a natural gas reformer.

Figure 2:
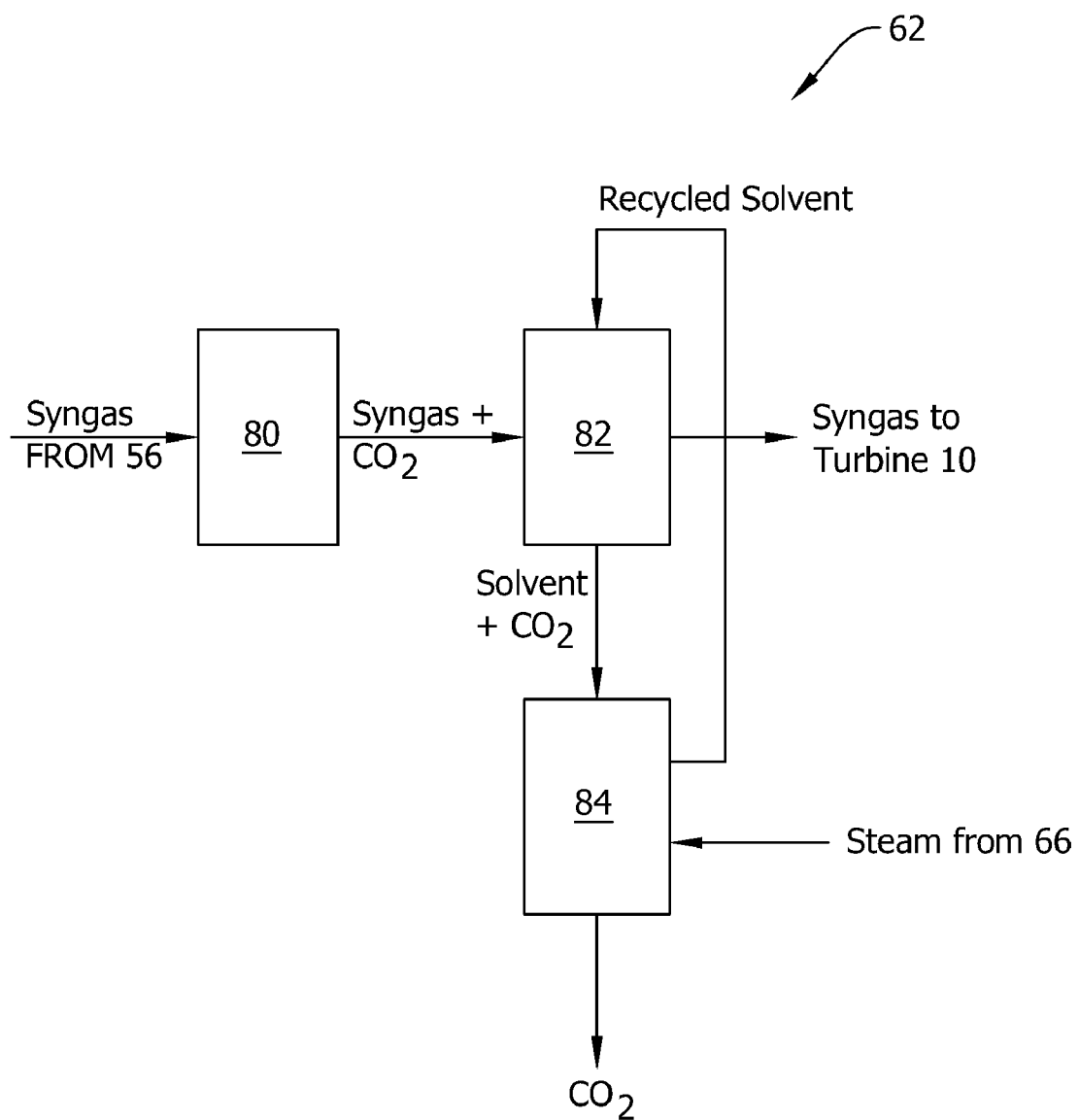
FIG. 2 is a schematic diagram of the clean-up system shown in FIG. 1.
Figure 3:
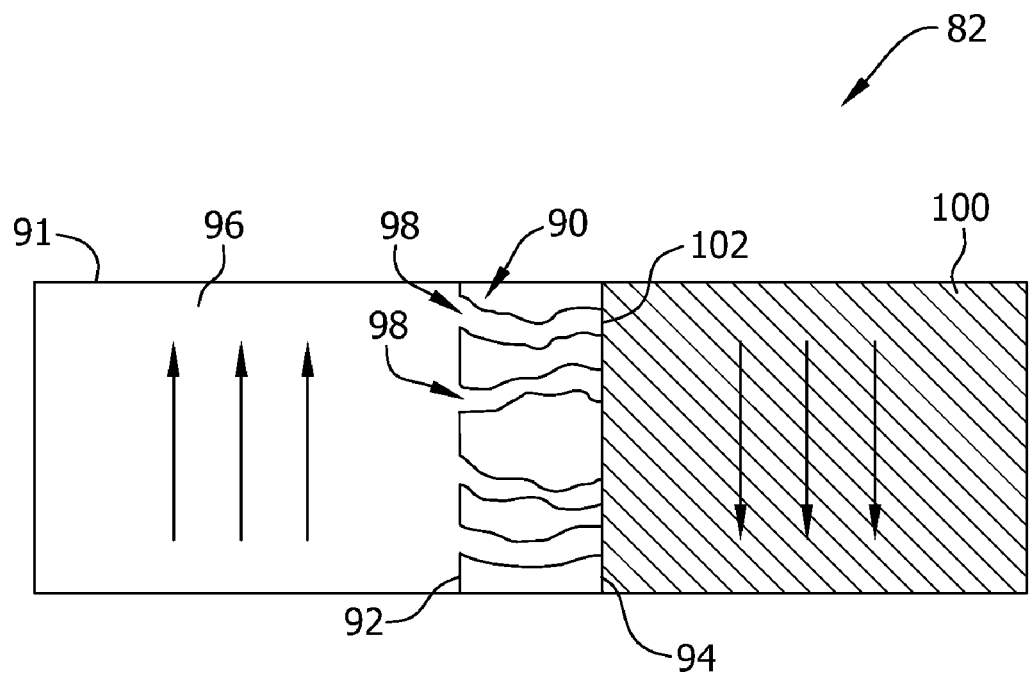
FIG. 3 is a schematic illustration of an embodiment of the chemical absorption unit shown in FIG. 2.

Referring also to FIG. 2, clean-up system 62 includes a water-gas shift reactor 80, a chemical absorber unit 82, and a solvent regeneration unit 84. Water-gas shift reactor 80 shifts the equilibrium of a mixture of CO, $H_2$, and $CO_2$ that is present in the syngas, generated in gasifier 56, to increase the amounts of $H_2$ and $CO_2$ in the syngas. The syngas that contains $CO_2$ is channeled from water-gas shift reactor 80 into chemical absorber 82 where the $CO_2$ is stripped from the syngas. Referring also to FIG. 3, absorber 82 operates to integrate membrane separation and solvent-based chemical absorption technologies to capture $CO_2$ from pre-combustion syngas. Absorber 82 includes gas-liquid membrane contactors 90 positioned inside a housing 91, and fabricated from hydrophobic material, for example, polytetrafluoroethylene (PTFE), including expanded polytetrafluoroethylene (ePTFE). Membrane contactors 90 each include a first surface 92, an opposing second surface 94, and micro-pores 98 that extend through contactor 90 and receive syngas during processing. It should be appreciated that membrane contactors 90 may be fabricated as inert hollow fibers, substantially planar sheets, and/or other known structures packaged in a tube-and-shell arrangement, spiral-wound module, and/or other known configurations. Membrane contactors 90 may be densely packaged as hollow fiber and/or modular units in the exemplary embodiment. Membrane contactors 90 provide a greater gas-liquid contact area per unit volume as compared to known absorbers implementing only chemical absorption processes. Also, ePTFE membrane contactors 90 increase the surface area contact between the syngas and solvent streams, making absorption more efficient than traditional absorption column configurations.

Membrane contactors 90 facilitate non-selective flow of syngas components 96 into micro-pores 98 as compared to known porous separation membranes that selectively facilitate passage of syngas components. Because membrane contactors 90 are hydrophobic, membrane contactors 90 prevent convective solvent flow across membrane contactor 90. Based on hydrophobic and micro-porous material characteristics, membrane contactors 90 facilitate contacting syngas components 96 and a solvent 100 without dispersion of one phase in another. Any suitable solvent that is capable of absorbing $CO_2$ can be used, such as, ammonia-based solvents and amine based solvents, for example, alkanol amines. Examples of alkanol amine solvents include, but are not limited to, monoethynolamine, diethynolamine, triethanolamine, methyl diethanolamine and mixtures thereof.

Membrane contactor 90 acts as a gas permeable barrier between the gas and liquid phases, so membrane contactors 90 do not actually separate $CO_2$ from syngas as compared to known porous separation membranes. Instead, solvent 100 provides the $CO_2$ separation selectivity. Membrane contactors 90 are contacting mediums between syngas 96 and solvent 100 to facilitate $CO_2$ separation from syngas 96 based on a chemical absorption process. In other words, $CO_2$ separation within absorber 82 is determined by a reaction of syngas 96 with the solvent separating agent 100 within absorber 82.

The contact area between syngas 96 and solvent 100 is an area sum of all gas-liquid interfaces 102 of all membrane contactors 90 provided within absorber 82. A packing density of membrane contactors 90 and/or micro-pores 98 provide a larger overall gas-liquid surface area contact as compared to total gas bubble surface areas caused by gas dispersion using known chemical absorption processes. As a result, membrane contactors 90 facilitate increasing $CO_2$ absorption efficiency as compared to known chemical absorption processes.

In the exemplary embodiment, membrane contactor 90 is fabricated from hydrophobic materials such as PTFE. Particularly, membrane contactor is fabricated from expanded polytetrafluoroethylene (ePTFE). Expanded polytetrafluoroethylene has a surface area of about 10 to about 100 $m^2/gr$ and a void volume of about 90% to about 95%. The surface area and void content of expanded polytetrafluoroethylene permits syngas 96 to contact solvent 100.

During syngas processing in the exemplary embodiment, syngas 96 and solvent 100 are channeled on opposite sides of membrane contactor 90 provided within absorber 82. Although syngas 96 and solvent 100 are illustrated as counter-current flows, it should be appreciated that syngas 96 and solvent 100 may flow concurrently in a same direction. As describe above, mass $CO_2$ transfer from syngas 96 occurs by diffusion of $CO_2$ through gas-liquid interfaces 102 using solvent 100 in a chemical absorption process.

A partial pressure gradient is applied within absorber 82 to transfer $CO_2$ mass through diffusion from a gas phase to a liquid phase by lowering a pressure of the syngas portion that is in contact with solvent 100. It should be appreciated that a vacuum, inert gas, and/or other driving force can create the necessary driving force for $CO_2$ mass transfer. By controlling pressure differences between syngas 96 and solvent 100, a portion of syngas 96 is immobilized in micro-pores 98 of membrane contactor 90 so that each gas-liquid interface 102 is located at a mouth of each micro-pore 98.

Because membrane contactors 90 serve as partitions between syngas 96 and solvent 100, a gas-liquid contact area is not disturbed by variations in flow rates. As a result of membrane contactor 90 and pressure control, absorber 82 facilitates transferring syngas 96 and solvent 100 over a wider range of independent flow rates as compared to flow rates of gas and liquids used in known absorber systems. Membrane contactor 90 and pressure control also facilitate reducing flooding, channeling, and/or back-mixing of solvent 100 into micro-pores 98. As such, absorber 82 can tolerate a wider range of variations in syngas processing conditions as compared to known absorber systems. Because the driving force for $CO_2$ separation from syngas 96 is a pressure gradient, a density difference between gas and liquid components are not required. As a result, membrane contactors 90 require no selectivity to $CO_2$ separation from syngas 96 as compared to known porous separation membranes.

Figure 4:
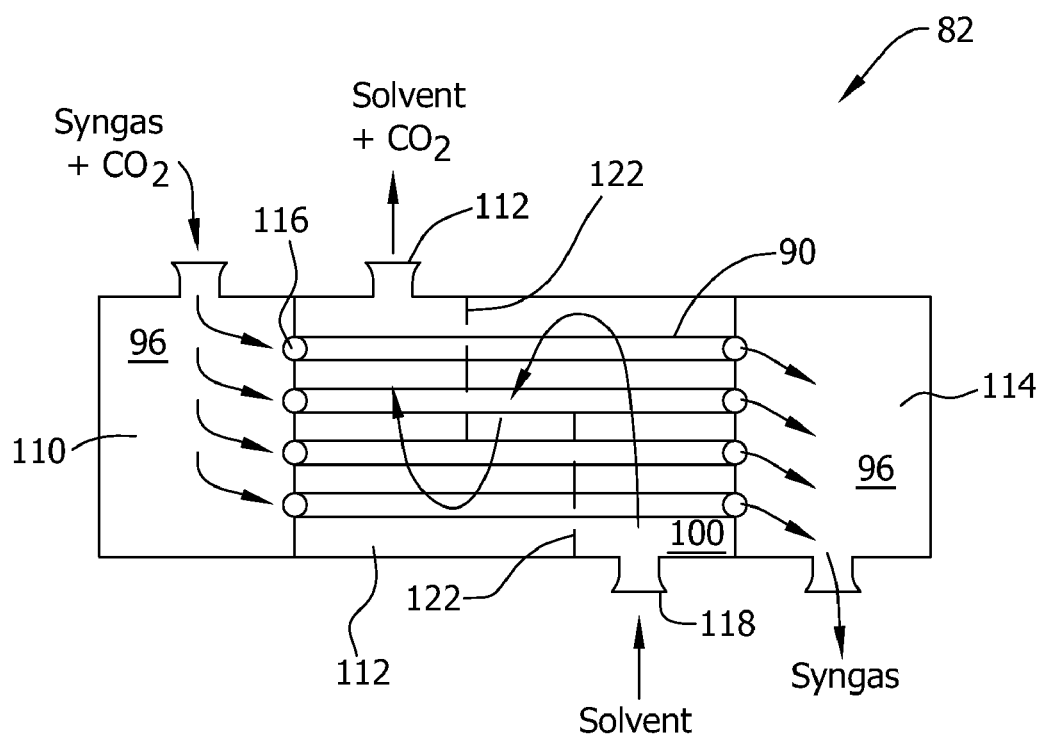
FIG. 4 is a schematic illustration of another embodiment of the chemical absorption unit shown in FIG. 2.

Also referring to FIG. 4, in another embodiment, membrane contactors 90 in absorber 82 are cylindrical tubular shaped contactors 90. Contactors 90 are positioned substantially parallel to each other and extend from an inlet chamber 110 through a solvent chamber 112 to an outlet chamber 114. Syngas 96 is channeled into inlet chamber 110, flows through a passage 116 in tubular contactors 90, and flows into outlet chamber 114. Solvent 100 is channeled into solvent chamber 112 through a solvent inlet 118, flows around tubular contactors 90 and exits solvent chamber through a solvent outlet 120. Solvent chamber 112 may also include baffles 122 to facilitate solvent flow around tubular contactors 90.

Referring again to FIG. 2, solvent 100 containing absorbed $CO_2$ is channeled from absorber 82 to solvent regeneration unit 84 where the $CO_2$ is stripped from solvent 100. The $CO_2$ may be removed from solvent 100 using heat or a pressure drop. In the exemplary embodiment, steam is channeled from heat recovery steam generator 66, shown in FIG. 1, to solvent regeneration unit 84. The $CO_2$-rich solvent 100 is heated to reverse the chemical reaction such that the absorbed $CO_2$ is released from solvent 100. The released $CO_2$ may be subsequently compressed and transported to storage, and the $CO_2$-lean solvent 100 may be recycled and reused in absorber 82.

Figure 5:
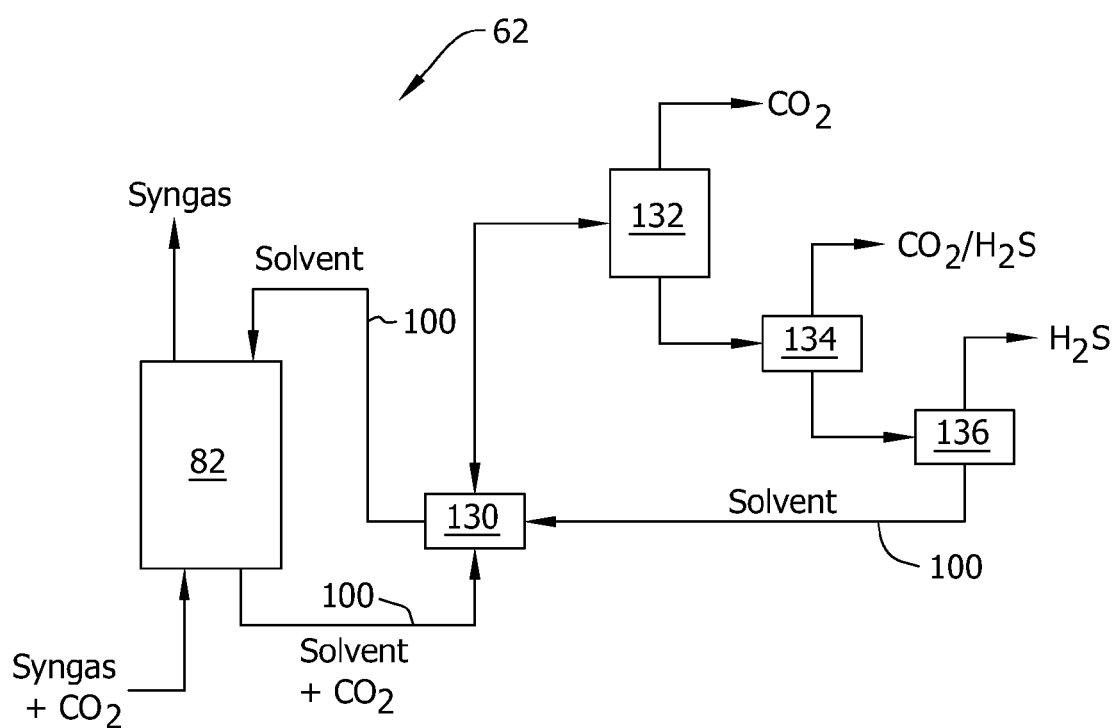
FIG. 5 is a schematic illustration of the solvent regeneration unit shown in FIG. 2.

In another embodiment, shown in FIG. 5, solvent 100 is used to remove both $CO_2$ and $H_2S$ from syngas 96. Solvent 100 containing $CO_2$ and $H_2S$ is channeled from absorber 82 to a heat exchanger 130 and then to a first flash tank 132 where a portion of $CO_2$ is removed from solvent 100. The remaining solvent 100 is channeled from first flash tank 132 to a second flash tank 134 where the remainder of $CO_2$ along with a portion of $H_2S$ is removed from solvent 100. The remaining solvent 100 is channeled from second flash tank 134 to a third flash tank 136 where the remainder of $H_2S$ is removed from solvent 100. Recycled solvent 100 is channeled through heat exchanger 130 and then into absorber 82. In another embodiment, heat may be used instead of a pressure drop in flash tanks 132, 134, and 136.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for processing pre-combustion syngas, said method comprising:
   providing an absorber unit having a housing that includes an inlet chamber, an outlet chamber downstream from the inlet chamber, and a solvent chamber therebetween, wherein the solvent chamber contains a solvent therein, and the absorber unit also includes a plurality of membrane contactors that are positioned substantially parallel to each other in the housing such that each of the membrane contactors extend from the inlet chamber through the solvent chamber to the outlet chamber, wherein each of the membrane contactors comprises a plurality of micro-pores;
   channeling pre-combustion syngas along a first surface of each of the membrane contactors;
   channeling the solvent along a second opposing surface of each of the membrane contactors; and
   contacting the solvent with the syngas such that the solvent and the syngas contact at gas-liquid interface areas, defined by the plurality of pores in each of the membrane contactors, to separate $CO_2$ from the syngas by a chemical absorption of $CO_2$ into the solvent to produce a solvent containing $CO_2$.

2. The method in accordance with claim 1 further comprising channeling the solvent containing $CO_2$ to a solvent regeneration unit coupled to the absorber unit.

3. The method in accordance with claim 2 further comprising:
   heating the solvent containing $CO_2$ to release $CO_2$ from the solvent to produce a reclaimed solvent; and
   channeling the reclaimed solvent to the absorber unit.

4. The method in accordance with claim 2 further comprising:
   reducing a pressure of the solvent containing $CO_2$ to release $CO_2$ from the solvent to produce a reclaimed solvent; and
   channeling the reclaimed solvent to the absorber unit.

5. The method in accordance with claim 1 wherein providing an absorber unit further comprises providing an absorber unit that includes a plurality of hydrophobic membrane contactors.

6. The method in accordance with claim 1 wherein providing an absorber unit further comprises providing an absorber unit that includes a plurality of expanded polytetrafluoroethylene membrane contactors.

7. The method in accordance with claim 1 wherein the solvent comprises an ammonia-based solvent or an alkanol amine based solvent.

8. The method in accordance with claim 7 wherein the alkanol amine based solvent is selected from the group consisting of monoethynolamine, diethynolamine, triethanolamine, methyl diethanolamine and mixtures thereof.

9. A pre-combustion syngas processing apparatus comprising an absorber unit, said absorber unit comprising:
   a housing comprising an inlet chamber, an outlet chamber downstream from said inlet chamber, and a solvent chamber therebetween, said solvent chamber is configured to contain a solvent therein;
   a plurality of membrane contactors positioned substantially parallel to each other in said housing such that each of said membrane contactors extend from said inlet chamber through said solvent chamber to said outlet chamber;
   and
   a syngas area within said housing, said syngas area containing pre-combustion syngas, said membrane contactors separating said solvent from said syngas, each of said membrane contactors comprising a plurality of micro-pores defining gas-liquid interface areas to separate $CO_2$ from the syngas by a chemical absorption of the $CO_2$ into said solvent.

10. The apparatus in accordance with claim 9 wherein each of said membrane contactors comprises a hydrophobic membrane contactor.

11. The apparatus in accordance with claim 9 wherein each of said membrane contactors comprises an expanded polytetrafluoroethylene membrane contactor.

12. The apparatus in accordance with claim 9 wherein each of said membrane contactors comprises a plurality of hollow fibers.

13. The apparatus in accordance with claim 12 wherein said plurality of hollow fibers is arranged in a tube-and-shell configuration.

14. The apparatus in accordance with claim 9 wherein each of said membrane contactors comprises a substantially planar sheet.

15. The apparatus in accordance with claim 14 wherein said substantially planar sheet is configured as a spiral-wound module.

16. The apparatus in accordance with claim 9 wherein said solvent comprises an ammonia-based solvent or an alkanol amine based solvent.

17. The apparatus in accordance with claim 16 wherein the alkanol amine based solvent is selected from the group consisting of monoethynolamine, diethynolamine, triethanolamine, methyl diethanolamine and mixtures thereof.

18. The apparatus in accordance with claim 9 further comprising a solvent regeneration unit.

19. The apparatus in accordance with claim 9 wherein said solvent regeneration unit is coupled to a steam line to heat said solvent containing $CO_2$ to release $CO_2$ from said solvent to produce a reclaimed solvent.

20. The apparatus in accordance with claim 9 wherein said solvent regeneration unit comprises at least one flash tank to provide a pressure reduction of said solvent containing $CO_2$ to release $CO_2$ from said solvent to produce a reclaimed solvent.

* * * * *